(12) United States Patent
Alich et al.

(10) Patent No.: US 8,281,652 B2
(45) Date of Patent: Oct. 9, 2012

(54) METHOD FOR TESTING THE FUNCTIONALITY OF AN OXIDATION CATALYST OF AN INTERNAL COMBUSTION ENGINE

(75) Inventors: Frank Alich, Tiddische (DE); Burkhard Veldten, Edemissen (DE); Volker Gehrke, Braunschweig (DE)

(73) Assignee: Volkswagen Aktiengesellschaft, Wolfsburg (DE)

( * ) Notice: Subject to any disclaimer, the term of this patent is extended or adjusted under 35 U.S.C. 154(b) by 411 days.

(21) Appl. No.: 12/674,478

(22) PCT Filed: Sep. 11, 2008

(86) PCT No.: PCT/EP2008/007458
§ 371 (c)(1),
(2), (4) Date: Feb. 22, 2010

(87) PCT Pub. No.: WO2009/039965
PCT Pub. Date: Apr. 2, 2009

(65) Prior Publication Data
US 2011/0107827 A1    May 12, 2011

(30) Foreign Application Priority Data
Sep. 21, 2007  (DE) .......................... 10 2007 045 256

(51) Int. Cl.
*G01M 15/10* (2006.01)
(52) U.S. Cl. .................................. 73/114.75; 73/114.69
(58) Field of Classification Search ............... 73/114.69, 73/114.75
See application file for complete search history.

(56) References Cited

U.S. PATENT DOCUMENTS

| | | | |
|---|---|---|---|
| 4,007,589 A | 2/1977 | Neidhard et al. | |
| 5,416,710 A | 5/1995 | Kuroda et al. | |
| 5,526,643 A | 6/1996 | Mukaihira et al. | |
| 5,528,898 A * | 6/1996 | Nakayama et al. | 60/276 |
| 5,531,069 A * | 7/1996 | Katsuhiko | 60/276 |
| 5,617,722 A | 4/1997 | Takaku | |
| 5,675,967 A | 10/1997 | Ries-Mueller | |
| 7,007,458 B2 * | 3/2006 | Mazur et al. | 60/277 |
| 7,536,851 B2 * | 5/2009 | Mc Lain | 60/277 |
| 2004/0168430 A1 | 9/2004 | Mazur et al. | |

FOREIGN PATENT DOCUMENTS

| | | |
|---|---|---|
| DE | 19654693 A1 | 7/1997 |
| EP | 1052385 A2 | 11/2000 |
| EP | 1085179 A2 | 3/2001 |
| EP | 1559894 A1 | 8/2005 |
| EP | 1574682 A1 | 9/2005 |

* cited by examiner

*Primary Examiner* — Freddie Kirkland, III
(74) *Attorney, Agent, or Firm* — Laurence A. Grrenberg; Werner H. Stemer; Ralph E. Locher

(57) ABSTRACT

A method of testing the functionality of an oxidation catalytic converter of an internal combustion engine, particularly a diesel engine, of a motor vehicle, includes the following steps: (a) verifying whether the motor vehicle is at a standstill; (b) verifying whether the internal combustion engine is idling; (c) verifying whether a temperature lies within a predetermined range upstream and downstream of the oxidation catalyst. Then, if all of the steps (a) to (c) yield an affirmative result, an intervention in the engine management is made in such a way that a predetermined temperature is set in the oxidation catalyst; (e) hydrocarbons (HCs) are actively produced by post-injecting fuel at a late point in time; (f) a lambda value is measured upstream and downstream of the oxidation catalyst as soon as the predetermined temperature from step (d) has been reached, and while HCs are actively produced in step (e). Then, a difference is determined between the lambda values measured upstream and downstream of the oxidation catalyst. If the difference is less than a predetermined value, a conclusion is reached that the oxidation catalyst is damaged.

4 Claims, No Drawings

METHOD FOR TESTING THE FUNCTIONALITY OF AN OXIDATION CATALYST OF AN INTERNAL COMBUSTION ENGINE

BACKGROUND OF THE INVENTION

Field of the Invention

The invention relates to methods for testing the functionality of an oxidation catalytic converter of an internal combustion engine, in particular of a diesel engine, of a motor vehicle.

With present diagnostic methods for oxidation catalytic converters, a total failure can be diagnosed, but it is not possible to diagnose partial damage which even already results in an increase in pollutant emissions.

BRIEF SUMMARY OF THE INVENTION

The invention is based on the object of providing functionally reliable monitoring of an oxidation catalytic converter, which monitoring, as well as detecting a pure total failure of the oxidation catalytic converter, also detects only partial damage to the oxidation catalytic converter.

Said object is achieved according to the invention by way of a method of the type specified above having the method steps specified in the claims. Advantageous refinements of the invention are also described in the claims.

For this purpose, the following steps are provided in a method of the abovementioned type:
(a) checking whether the vehicle is at a standstill,
(b) checking whether the internal combustion engine is at idle,
(c) checking whether a temperature upstream and downstream of the oxidation catalytic converter lies within a predetermined range,
(d) if the checks in all of steps (a) to (c) are each answered "yes", actively intervening in the engine management such that a predetermined temperature is set in the oxidation catalytic converter,
(e) actively generating HC by means of a late post-injection of fuel,
(f) measuring a lambda value upstream and downstream of the oxidation catalytic converter when the predetermined temperature in step (d) is reached and while HC is actively generated in step (e),
(g) determining a difference between the lambda values upstream and downstream of the oxidation catalytic converter and
(h) establishing that the oxidation catalytic converter is damaged if the difference from step (g) is smaller than a predetermined value.

This has the advantage that even partially damaged oxidation catalytic converters can be detected within a very short time period of less than 10 seconds. Using lambda delta—the difference from step (g)—conversion activity at said temperature is checked, such that the target temperature determines the severity of the diagnosis.

The predetermined temperature in step (d) is expediently the activation temperature of the undamaged oxidation catalytic converter.

The temperature in the oxidation catalytic converter is determined for example from a temperature measured upstream and/or downstream of the oxidation catalytic converter.

The invention is explained in more detail below.

DESCRIPTION OF THE INVENTION

The diagnosis is carried out when the vehicle is at a standstill and the engine is at idle if the temperatures upstream and downstream of the oxidation catalytic converter are in a valid range. The temperature must not be too high, since otherwise no defect can be detected and cooling would take too long. If said temperature is too low, the heating up to the target temperature would take too long. If all the enablement conditions are met, the temperature upstream of the oxidation catalytic converter is set to a predetermined target temperature. This takes place by means of corresponding active intervention in the engine management. For example, the temperature upstream of the oxidation catalytic converter is increased by means of throttling (less cooling by fresh air) and early post-injection which produces additional heat energy. The diagnosis itself takes place subsequently, for example when the desired temperature upstream of the oxidation catalytic converter has been reached. Here, hydrocarbons (HC) are generated by means of a late post-injection, and a lambda value upstream and downstream of the oxidation catalytic converter is measured. The diagnosis of the damage to the oxidation catalytic converter takes place by evaluating a difference between the lambda value upstream and downstream of the catalytic converter. If the magnitude of said difference lies below a predetermined value, then the oxidation catalytic converter is damaged since it then oxidizes too little HC and CO.

A critical temperature range in which the diagnosis according to the invention is permitted and activated is the activation temperature of the oxidation catalytic converter, that is to say the temperature at which the oxidation catalytic converter is capable of oxidizing HC and CO. In an aged oxidation catalytic converter, said temperature is shifted upward, which leads to the activation taking place later in the exhaust-gas test cycle, as a result of which the overall efficiency of said exhaust-gas aftertreatment measure is then impaired.

In the method according to the invention, no fuel-consumption-increasing and emissions-increasing activation as a result of the suspicion of damage is required, since as a result of the considerably lower excess emissions during the diagnostic intervention according to the invention, the latter can be carried out more frequently.

To enable the diagnostic method according to the invention, the exhaust-gas temperature directly upstream and downstream of the oxidation catalytic converter is measured. The lambda signals are measured at a first point upstream of the oxidation catalytic converter and at a second point downstream of the oxidation catalytic converter.

The diagnosis according to the invention should be carried out precisely when the activation temperature of the oxidation catalytic converter is reached, since active cooling is barely possible. The diagnosis therefore takes place preferably at or immediately above the activation temperature.

The invention claimed is:
1. A method of testing the functionality of an oxidation catalytic converter of an internal combustion engine of a motor vehicle, which comprises the following steps:
 (a) checking whether the motor vehicle is at a standstill;
 (b) checking whether the internal combustion engine is at idle;
 (c) checking whether a temperature upstream and downstream of the oxidation catalytic converter lies within a predetermined range;

(d) if each of steps (a), (b), and (c) is answered in the affirmative, actively intervening in an engine management to establish a predetermined temperature in the oxidation catalytic converter;

(e) actively generating HC by way of a late post-injection of fuel;

(f) measuring a lambda value upstream and downstream of the oxidation catalytic converter when the predetermined temperature in step (d) is reached and while HC is actively being generated in step (e);

(g) determining a difference between the lambda values upstream and downstream of the oxidation catalytic converter; and (h) characterizing the oxidation catalytic converter as damaged if the difference between the lambda values upstream and downstream of the oxidation catalytic converter in step (g) is smaller than a predetermined value.

2. The method according to claim 1, which comprises using an activation temperature of the oxidation catalytic converter in an undamaged condition as the predetermined temperature in step (d).

3. The method according to claim 1, which comprises determining the temperature in the oxidation catalytic converter from a temperature measured upstream of the oxidation catalytic converter and downstream of the oxidation catalytic converter.

4. The method according to claim 1, wherein the internal combustion engine is a diesel engine.

* * * * *